United States Patent
Aou et al.

(10) Patent No.: US 10,752,830 B2
(45) Date of Patent: Aug. 25, 2020

(54) PROPPANT COATING FOR HEAVY METAL RECOVERY

(71) Applicant: Dow Global Technologies LLC, Midland, MI (US)

(72) Inventors: Kaoru Aou, Lake Jackson, TX (US); Juan Carlos Medina, Lake Jackson, TX (US); H. Robert Goltz, Midland, MI (US); Sachit Goyal, Houston, TX (US); Arjun Raghuraman, Pearland, TX (US); Fabio Aguirre Vargas, Lake Jackson, TX (US); Avery L. Watkins, Pearland, TX (US); David A. Reuschle, Lake Jackson, TX (US); Ann F. Johnson, Lake Jackson, TX (US); Yasmin N. Srivastava, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/740,383

(22) PCT Filed: Jun. 27, 2016

(86) PCT No.: PCT/US2016/039492
§ 371 (c)(1),
(2) Date: Dec. 28, 2017

(87) PCT Pub. No.: WO2017/003904
PCT Pub. Date: Jan. 5, 2017

(65) Prior Publication Data
US 2018/0194992 A1    Jul. 12, 2018

Related U.S. Application Data

(60) Provisional application No. 62/186,669, filed on Jun. 30, 2015, provisional application No. 62/186,671, (Continued)

(51) Int. Cl.
*C09K 8/80* (2006.01)
*B29C 70/32* (2006.01)
(Continued)

(52) U.S. Cl.
CPC .......... *C09K 8/805* (2013.01); *B29C 70/021* (2013.01); *B29C 70/026* (2013.01); (Continued)

(58) Field of Classification Search
None
See application file for complete search history.

(56) References Cited

U.S. PATENT DOCUMENTS 4,937,366 A    6/1990    Nodelman
5,196,124 A *  3/1993    Connor .................. B09C 1/002
                                                    166/270.1
(Continued)

FOREIGN PATENT DOCUMENTS

| EP | 2444377 | 4/2012 |
|----|---------|--------|
| WO | 199406998 | 3/1994 |
| WO | 2013059793 | 4/2013 |

OTHER PUBLICATIONS

Gordon, Louis, et. al., "Coprecipitation of Radium with Barium Sulfate," Analytical Chemistry, 1957, p. 34-37, v. 29, No. 1.
(Continued)

*Primary Examiner* — Angela M DiTrani Leff
*Assistant Examiner* — Charles R Nold

(57) ABSTRACT

A coated proppant includes a solid core proppant particle and a heavy metal recovery coating, including heavy metal
(Continued)

recovery crystals embedded within a polymer resin matrix. A process for the manufacture of a coated proppant includes providing a solid core proppant particle, and forming on the solid core proppant particle, a heavy metal recovery coating including heavy metal recovery crystals embedded within a polymer resin matrix.

7 Claims, 1 Drawing Sheet

Related U.S. Application Data filed on Jun. 30, 2015, provisional application No. 62/186,645, filed on Jun. 30, 2015.

(51) Int. Cl.

| | | |
|---|---|---|
| B29C 70/52 | (2006.01) | |
| B29C 70/88 | (2006.01) | |
| F16L 9/12 | (2006.01) | |
| C09D 5/00 | (2006.01) | |
| B29C 70/02 | (2006.01) | |
| B29C 70/08 | (2006.01) | |
| B29C 70/38 | (2006.01) | |
| C09K 8/528 | (2006.01) | |
| B29K 101/10 | (2006.01) | |
| B29K 101/12 | (2006.01) | |
| B29L 23/00 | (2006.01) | |
| C02F 1/28 | (2006.01) | |
| C02F 101/00 | (2006.01) | |
| C02F 103/06 | (2006.01) | |
| E21B 43/267 | (2006.01) | |

(52) U.S. Cl.
CPC ............ *B29C 70/085* (2013.01); *B29C 70/32* (2013.01); *B29C 70/382* (2013.01); *B29C 70/52* (2013.01); *B29C 70/88* (2013.01); *C09D 5/00* (2013.01); *F16L 9/12* (2013.01); *B29K 2101/10* (2013.01); *B29K 2101/12* (2013.01); *B29L 2023/22* (2013.01); *C02F 1/288* (2013.01); *C02F 2101/006* (2013.01); *C02F 2103/06* (2013.01); *C09K 8/528* (2013.01); *E21B 43/267* (2013.01)

(56) References Cited

U.S. PATENT DOCUMENTS

| | | |
|---|---|---|
| 5,728,302 A | 3/1998 | Connor et al. |
| 7,063,151 B2 | 6/2006 | Nguyen et al. |
| 7,261,156 B2 | 8/2007 | Nguyen et al. |
| 7,264,051 B2 | 9/2007 | Nguyen et al. |
| 7,308,939 B2 | 12/2007 | Welton et al. |
| 7,350,571 B2 | 4/2008 | Nguyen et al. |
| 7,799,744 B2 | 9/2010 | Welton et al. |
| 8,567,502 B2 | 10/2013 | O'Malley et al. |
| 8,726,989 B2 | 5/2014 | Nevin |
| 8,746,335 B2 | 6/2014 | Nevin |
| 8,763,700 B2 | 7/2014 | McDaniel et al. |
| 2005/0194135 A1 | 9/2005 | Nguyen et al. |
| 2011/0118155 A1 | 5/2011 | Pisklak et al. |
| 2012/0322696 A1 | 12/2012 | Hayes et al. |
| 2013/0056204 A1 | 3/2013 | McDaniel et al. |
| 2013/0065800 A1 | 3/2013 | McDaniel et al. |
| 2013/0180714 A1 | 7/2013 | Nevin |
| 2013/0186624 A1 | 7/2013 | McCrary et al. |
| 2016/0137904 A1* | 5/2016 | Drake .................. C09K 8/536 507/219 |
| 2016/0251571 A1* | 9/2016 | Agrawal ............... A61K 33/18 507/219 |
| 2018/0134949 A1* | 5/2018 | Monastiriotis ......... C09K 8/805 |

OTHER PUBLICATIONS

Bozau, Elke, et. al., "Hydrogeochemical modelling of corrosion effects and barite scaling in deep geothermal wells of the North German Basin using PHREEQC and PHAST," Geothermics, 2015, p. 540-547, v. 53, Elsevier.

Fischer, Carl, et. al., "Determination of Cations in Hydraulic Fracturing Flowback Water from the Marcellus Shale," Application Note 1094, Thermo Fischer Scientific.

Nelson, Andrew W., "Matrix Complications in the Determination of Radium Levels in Hydraulic Fracturing Flowback Water from Marcellus Shale," Environmental Science & Technology Letters, 2014, p. 204-208, v. 1, ACS Publications.

Kondash, Andrew J., et. al., "Radium and Barium Removal through Blending Hydraulic Fracturing Fluids with Acid Mine Drainage," Environmental Science & Technology, 2014, p. 1334-1342, v. 48, ACS Publications.

Al-Masri, M.S., et. al., "Distribution of scales containing NORM in different oilfields equipment," Applied Radiation and Isotopes, 2005, p. 457-463, v. 63, Elsevier.

* cited by examiner

PROPPANT COATING FOR HEAVY METAL RECOVERY

FIELD

Embodiments relate to coatings for proppants that are enabled for heavy metal recovery (e.g., recovery of radioactive elements such as radium and uranium), proppants that have the coatings thereon, methods of making the coatings, and methods of coating the proppants with the coatings.

INTRODUCTION

Generally, well fracturing is a process of injecting a fracturing fluid at high pressure into subterranean rocks, boreholes, etc., so as to force open existing fissures and extract oil or gas therefrom. Proppants are solid material in particulate form for use in well fracturing. Proppants should be strong enough to keep fractures propped open in deep hydrocarbon formations, e.g., during or following an (induced) hydraulic fracturing treatment. Thus, the proppants act as a "propping agent" during well fracturing. The proppants may be introduced into the subterranean rocks, boreholes, etc., within the fracturing fluid. The proppants may be coated for providing enhanced properties such as hardness and/or crush resistance. It is also proposed that the proppants may be further coated to enable heavy metal recovery, such as recovery of radioactive elements.

SUMMARY

Embodiments may be realized by providing a coated proppant that includes a solid core proppant particle and a heavy metal recovery coating, including heavy metal recovery crystals embedded within a polymer resin matrix. Embodiments may also be realized by providing a method of making such a coated proppant.

BRIEF DESCRIPTION OF THE DRAWINGS

Features of the embodiments will become more apparent to those of ordinary skill in the art by describing in detail exemplary embodiments thereof with reference to the attached figures, in which.

DETAILED DESCRIPTION

Figure 1:
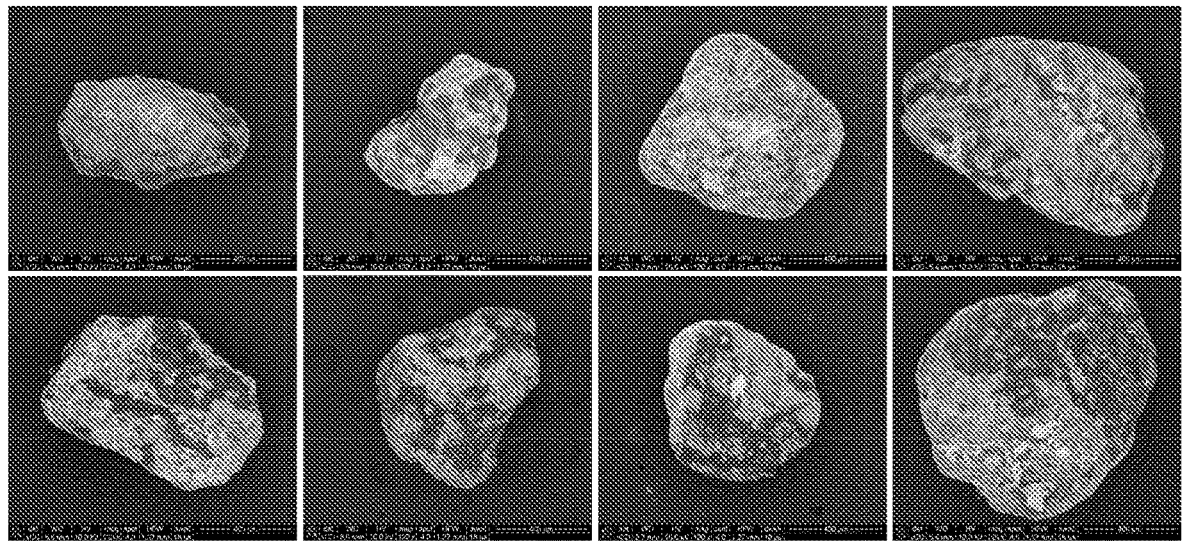
FIG. 1 illustrates SEM analysis at 10.0 kV of eight different samples of coated sand with scale bars, as indicated.

Contaminated water produced from a well during well fracturing should be reused and/or treated to remove the contaminants (especially heavy metals, e.g., as discussed in U.S. Pat. No. 8,763,700). Typically, the contaminated water can be captured and treated. Exemplary treatment systems include packed beds of activated charcoal for the removal of organic compounds, permanent or portable ion exchange columns, electrodialysis and similar forms of membrane separation, freeze/thaw separation, spray evaporation, and combinations thereof. Dual function proppants are proposed in U.S. Pat. No. 8,763,700, which provide good conductivity in an oil or gas production well while also removing at least some of the impurities found in the contaminated downhole water and hydrocarbons. Improved coated proppants that combine the strength and/or flexibility of a polymer resin based coated (such as at least one selected from the group of a polyurethane based coating and an epoxy based coating) with a contaminant removal substance are sought. For example, the coated proppants according to exemplary embodiments, may incorporate/embed a heavy metal removal substance into a polymer resin based matrix in order to provide strength and/or flexibility to both the overall coated proppant and the layer on the coated proppant that incorporates/embeds the heavy metal removal substance.

With respect to heavy metal recovery, circulated contaminated water that exits a fracturing well may include significant amounts of radioactive elements (such as radium and/or uranium) and ions (such as $Na^+$ and $Ca^{2+}$). The use of chemical chelating agents, such as used in ion exchange resins, may not be suitable for selective capturing very minute quantities of radium in water, especially when the water contains $Ca^{2+}$ ions, which have a high affinity to chemical chelating agents.

Further, modifying fracturing fluid, which is fed into the oil or gas wells and later recovered as contaminated water, to include compounds that are capable of enhancing heavy metal recovery (e.g., by causing heavy metal ions to crystallize out of the fracturing fluid) may not be productive because large crystals can form and/or aggregate to block channels that hydrocarbons should travel through. In other words, the additional compounds may hinder and/or decrease the oil or gas recovery. For example, while barium sulfate ($BaSO_4$) may cause radium ions to crystallize out of an aqueous solution and onto crystal surfaces thereon (e.g., see Gordon, L.; Rowley, K. Analytical Chemistry, 1957, 29, 34-37), the resulting barium sulfate crystal with the radium ions may flow back above ground. As such, the radioactive radium may come above ground in more concentrated form (e.g., on the barium sulfate crystals, such as after separating the barium sulfate crystal solids from the rest of the contaminated water) than before (more diluted in water). Barium sulfate is also known to cause scaling in oil and gas wells. With respect to barium sulfate, when $Ba^{2+}$ ions and $SO_4^{2-}$ ions come into contact and precipitate out, the resultant barium sulfate may cause narrowing and/or sometimes clogging of the well bore, leading to loss of hydrocarbon recovery from oil or gas wells (e.g., see Bozau, E.; Haussler, S; van Berk, W. Geothermics, 2015, 53, 540-547). For example, in offshore oil or gas wells, an undesired side effect is the formation of barium sulfate (barite) in the tubes. In particular, when the $SO_4^{2-}$ rich sea water comes in contact with the $Ba^{2+}$ contained in a fracturing fluid (e.g., brine solution), insoluble barium sulfate is formed. In addition, if barium sulfate crystals are added into the fracturing fluid, then they may serve as nucleating sites for even larger barium sulfate crystals to form from the $Ba^{2+}$ and $SO_4^{2-}$ ions, further enhancing the scaling problem. Therefore, it is often sought to remove barium sulfate from, and not add barium sulfate directly to fracturing fluid.

Accordingly, embodiments relate to providing a system in which heavy metals such as radioactive materials from contaminated water can be absorbed into/onto a matrix including heavy metal recovery crystals, while minimizing and/or avoiding scaling issues associated with large crystal and/or aggregate formation in fracturing fluids for oil or gas recovery. In particular, embodiments relate to providing the heavy metal recovery crystals embedded within a polymer resin matrix, which is coated onto a solid core proppant particle. The metal-sulfate crystals on the proppant particle may aid in heavy metal recovery by causing heavy metals, such as particles of radioactive radium, to partition onto the coated proppant and away from the contaminated water. The heavy metal recovery crystals may be distinguishable from particulates that comprise an ion exchange resin (e.g., which non-selectively reduces the content of heavy metals by the reversible process of exchanging an ion within the particulate for the radium) and/or a molecular sieve (e.g., which non-selectively reduces the content of heavy metals by allowing particles of a particular size to be pass through holes in particulates appropriately sized). In particular, the selective post-precipitation of heavy metals such radium ions onto previously formed crystals (e.g., barite crystals) by lattice replacement (lattice defect occupation), adsorption, or other mechanism, is distinctly different from other capture modes such as ion exchange or molecular sieving. For example, the post-precipitation of heavy metals such as radium on pre-formed barite crystals is selective for radium because of similar size and electronic structure of radium and barium. In exemplary embodiments, the heavy metal recovery crystals may form a crystalline structure that is appropriately sized to hold the heavy metals such as radium thereon or therewithin. Therefore, the heavy metal recovery crystals may pull the radium out of fracturing fluid and hold the ions on or within the heavy metal recovery coating, so as to reduce radium content in the fracturing fluid. Also, the heavy metal recovery crystals having radium may remain underground in the fracturing well, as is typically with the use of proppants in well fracturing.

The polymer resin matrix having the heavy metal recovery crystals may act as a permeable or semi-permeable polymer resin, with respect to the heavy metal recovery crystals and/or the heavy metals. For example, the heavy metals may be rendered immobile on an outer surface of the proppant particle and/or rendered immobile within the polymer resin matrix. The polymer resin matrix may provide the additional benefit of being formulated to maintain its properties even when exposed to high temperature, e.g., to temperatures of at least 70° C. The performance of coatings for proppants, especially in downwell applications at higher temperatures (such as greater than 120° C.) and elevated pressures (such as in excess of 6000 psig), may be further improved by designing a multilayer coating structure, where the top layer may be permeable or semi-permeable, while the undercoat layer may be composed of polymer resin matrix that can retain a high storage modulus at high temperatures (such as up to at least 175° C.), which may be typically encountered during hydraulic fracturing of deep strata. For example, the underlying polymer resin matrix may be include polyurethane based polymers and/or epoxy based polymers (which encompasses polyurethane/epoxy hybrid polymers), which offer various advantages in resin-coated proppant applications, e.g., such as ease of processing, base stability, and/or rapid cure rates that enable short cycle times for forming the coating. Further, polyurethane polymers and/or epoxy polymers may be readily formulated to provide a permeable or semi-permeable layer with one formulation, and a high storage modulus layer with another formulation, in some cases using the same combination of raw materials but at different ratios.

In embodiments, a solid core proppant particle is coated with at least a heavy metal recovery coating that includes at least the heavy metal recovery crystals, which are embedded within and/or on a polymer resin matrix. The heavy metal recovery coating may be a dual function coating that provides the benefit of heavy metal recovery and the additional benefit associated with resin coatings on proppants. The coating proppant may include one or more heavy metal recovery coatings/layers. The coating proppant may include one or more polymer resin coating/layers, e.g., one or more polyurethane based coatings/layers and/or one or more epoxy based coatings/layers (which encompasses one or more polyurethane/epoxy hybrid based coatings/layers). The coated proppant may include additional coatings/layers derived from one or more preformed isocyanurate tri-isocyanates and one or more curatives. The different coatings/layers may be sequentially formed and/or may be formed at different times. For example, the heavy metal recovery coating may be formed on a pre-formed polymer resin coated proppant or the heavy metal recovery coating may be formed immediately after and/or concurrent with forming a polymer resin coating of a proppant. The heavy metal recovery coating may be applied to proppant and/or composite applications. Exemplary composite applications include use of the heavy metal recover coating to coat the interior of tubes, pipe, and/or pipelines (e.g., that are used in well fracturing).

Coatings

In embodiments, a coated solid core proppant particle includes at least a heavy metal recovery coating, which may be the top coat (outermost coating) forming the coated proppant. The coated solid core proppant particle may optional include additional coats/layers under the heavy metal recover coating. The heavy metal recovery coating includes at least heavy metal recovery crystals embedded on and/or within a polymer resin matrix, such as a polyurethane polymer matrix. For example, the heavy metal recovery crystals may be at least in part embedded with a matrix of a polymer resin, such that the sides and optionally bottom surfaces of the heavy metal recovery crystals are encapsulated by the polymer resin. The heavy metal recovery crystals may be at least in part directly on to top of the matrix of polymer resin, so that bottom surfaces of the heavy metal recovery crystals are surrounded by the polymer resin. The heavy metal recovery coating may account for less than 10 wt %, less than 5 wt %, less than 3 wt %, less than 2 wt %, and/or less than 1 wt % of a total weight of the coated proppant. The heavy metal recovery crystals may account for 1 wt % to 99 wt % (e.g., 15 wt % to 85 wt %, etc.) of the total weight of the heavy metal recovery coating. The amount of the heavy metal recovery crystals in the heavy metal recovery coating may vary depending on how the heavy metal recovery coating is formed, the overall thickness of the heaving metal recovery coating, and/or whether the heavy recovery coating is formed as a separate layer from any optional undercoat. The heavy metal recovery crystals may account for 90 wt % to 100 wt % (e.g., 99 wt % to 100 wt %) of a crystalline content in the heavy metal recovery coating.

Exemplary heavy metal recovery crystals are metal-sulfates, metal oxides, and/or any combination thereof. The heavy metal recovery crystals are solids at room temperature. The heavy metal recovery crystals may have a melting point greater than 500° C., greater than 800° C., and/or greater than 1000° C. The melting point of the heavy metal recovery crystals may be less than 2500° C. The heavy metal recovery crystals may be metallic materials that form a crystalline matrix (also referred to as a crystal lattice) appropriately sized to allow for absorption of heavy metals such as radium into the crystalline matrix. For example, the microstructure of the heavy metal recovery crystals may allow for absorption of radium atoms into a crystal lattice (e.g., a crystal lattice formed by barium sulfate).

Exemplary metal-sulfates include alkali metal-sulfates and alkaline earth metal-sulfates. Exemplary metal-sulfates include barium sulfate and strontium sulfate. Exemplary metal oxides include manganese oxides such as Manganese (II) oxide (MnO), Manganese(II,III) oxide (Mn$_3$O$_4$), Manganese(III) oxide (Mn$_2$O$_3$), Manganese dioxide (MnO$_2$), and Manganese(VII) oxide (Mn$_2$O$_7$). Exemplary manganese oxide based minerals include birnessite, hausmannite, manganite, manganosite, psilomelane, and pyrolusite. In exemplary embodiments, the heavy metal recovery crystals include at least 20 wt %, 50 wt %, at least 70 wt %, at least 80 wt %, at least 90 wt %, at least 95 wt %, and/or at least 99 wt % of alkaline earth metal-sulfates, based on the total weight of the heavy metal recovery crystals.

In exemplary embodiments, the heavy metal recovery crystals may include at least 20 wt % (at least 40 wt %, at least 50 wt %, at least 60 wt %, at least 70 wt %, at least 80 wt %, at least 90 wt %, and/or 100 wt %) of alkaline earth metal-sulfates, based on the total weight of the heavy metal recovery crystals in the heavy metal recovery coating. The heavy metal recovery crystals may include at least 50 wt % (at least 60 wt %, at least 70 wt %, at least 80 wt %, at least 90 wt %, at least 95 wt %, at least 98 wt %, at least 99 wt %, and/or 100 wt %) of barium sulfate, based on the total weight of the heavy metal recovery crystals in the heavy metal recovery coating.

The heavy metal recovery crystals may be added directly during a process of forming the heavy metal recovery coating. Optionally, the heavy metal recovery crystals may be provided in a carrier polymer when forming the heavy metal recovery coating. Exemplary carrier polymers include polyols, polyether polyols, polyester polyols, liquid epoxy resin, liquid acrylic resins, polyacids such as polyacrylic acid, a polystyrene based copolymer resins (exemplary polystyrene based copolymer resins include crosslinked polystyrene-divinylbenzene copolymer resins), and combinations thereof. One than one carrier polyol may be used, e.g., a combination of a liquid epoxy resin with barium sulfate therein and a carrier polyol with barium sulfate therein may be used. The carrier polyol may be a resin that is crosslinkable so as to provide a permeable or semi-permeable layer on the solid core proppant particle.

The carrier polymer may be present in an amount from 15 wt % to 85 wt %, based on the total weight of the heavy metal recovery crystals and the carrier polymer. The amount of the carrier polymer used may be lower when the heavy metal recovery coating is formed immediately after a polymer resin undercoat layer is formed (e.g., a polyurethane based undercoat layer), e.g., the amount of the carrier polymer may be from, e.g., 15 wt % to 60 wt %, 15 wt % to 50 wt %, 20 wt % to 45 wt %, 25 wt % to 45 wt %, 30 wt % to 40 wt %, etc., based on the total weight of the heavy metal recovery crystals and the carrier polyol. The amount of the carrier polymer used may be higher when the heavy metal recovery coating is formed concurrent with a polymer resin layer such as a polyurethane based layer and/or epoxy based layer (i.e., a prior polymer resin undercoat layer is not formed), e.g., the amount of the carrier polymer may be from, e.g., 20 wt % to 85 wt %, 30 wt % to 85 wt %, 45 wt % to 85 wt %, 60 wt % to 85 wt %, 65 wt % to 75 wt %, etc., based on the total weight of the heavy metal recovery crystals and the carrier polymer. In exemplary embodiments, the carrier polymer includes a polyether polyol and/or a liquid epoxy resin.

In exemplary embodiments, the carrier polymer may be a carrier polyol that is a polyol having a number average molecular weight from 60 g/mol to 6000 g/mol. In some exemplary embodiments, the carrier polymer has a low to average number average molecular weight, e.g., 60 g/mol to 3000 g/mol, 60 g/mol to 2000 g/mol, 60 g/mol to 1500 g/mol, 60 g/mol to 1000 g/mol, 60 g/mol to 500 g/mol, 60 g/mol to 400 g/mol, 60 g/mol to 300 g/mol, etc. In other exemplary embodiments, the carrier polyol includes at least one polyol that has a high number average molecular weight, e.g., from 3000 g/mol to 6000 g/mol, 4000 g/mol to 6000 g/mol, 4500 g/mol to 5500 g/mol, etc. When the heavy metal recovery crystals are provided in a carrier polyol having a high number average molecular weight, a lesser amount of the carrier polyol may be used. The carrier polyol may have on average from 1 to 8 hydroxyl groups per molecule, e.g., from 2 to 4 hydroxyl groups per molecule. For example, the one or more polyols may independently be a diol or triol. The carrier polyol may be a hydrophilic polyol, e.g., an ethylene oxide rich polyether polyol that has an EO content of greater than 50 wt % (e.g., from 60 wt % to 95 wt %, 65 wt % to 90 wt %, 70 wt % to 85 wt %, etc.), based on the total weight of the ethylene oxide rich polyether polyol. The carrier polyol may be a simple polyol such as ethylene glycol, diethylene glycol, triethylene glycol, 1,2-propanediol, dipropylene glycol, tripropylene glycol, 1,4-butanediol, 1,6-hexanediol, glycerol, and the like simple polyols that may be used as the initiator for forming a polyether polyol (as would be understood by a person of ordinary skill in the art). The carrier polyol may include any combination thereof, e.g., a combination of the polyether polyol and the simple polyol. For example, the carrier polyol may include from 1 wt % to 99 wt % (e.g., 20 wt % to 95 wt %, 30 wt % to 95 wt %, 40 wt % to 95 wt %, 50 wt % to 95 wt %, 60 wt % to 95 wt %, etc.) of one or more polyether polyols and from 1 wt % to 99 wt % (e.g., 5 wt % to 80 wt %, 5 wt % to 70 wt %, 5 wt % to 60 wt %, 5 wt % to 50 wt %, 5 wt % to 40 wt %, etc.) of one or more simple polyols.

In exemplary embodiments, the carrier polymer may be a liquid epoxy resin that forms an epoxy based matrix in a final curable formulation. For example, useful epoxy compounds may include any conventional epoxy compound. The epoxy compound used, may be, e.g., a single epoxy compound used alone or a combination of two or more epoxy compounds known in the art such as any of the epoxy compounds described in Lee, H. and Neville, K., Handbook of Epoxy Resins, McGraw-Hill Book Company, New York, 1967, Chapter 2, pages 2-1 to 2-27. The epoxy resin may be based on reaction products of polyfunctional alcohols, phenols, cycloaliphatic carboxylic acids, aromatic amines, or aminophenols with epichlorohydrin. For example, the liquid epoxy resin may be based on bisphenol A diglycidyl ether, bisphenol F diglycidyl ether, resorcinol diglycidyl ether, or triglycidyl ethers of para-aminophenols. Other exemplary epoxy resins include reaction products of epichlorohydrin with o-cresol and, respectively, phenol novolacs. Exemplary, commercially available epoxy related products include, e.g., D.E.R.™ 331, D.E.R.™ 332, D.E.R.™ 334, D.E.R.™ 580, D.E.N.™ 431, D.E.N.™ 438, D.E.R.™ 736, or D.E.R.™ 732 epoxy resins available from The Dow Chemical Company. In exemplary embodiments, when the liquid epoxy resin is used as a carrier polymer, a polyurethane based undercoat may be formed on the solid core proppant particle.

In embodiments, the polymer resin matrix includes, e.g., one or more polyurethane resins, one or more epoxy resins, one or more polyurethane/epoxy hybrid resins, and/or one or more phenolic-formaldehyde resins. Optionally, one or more polymer resin based undercoats may be formed under the polymer resin matrix of the heavy metal recovery coating, e.g., one or more phenolic-formaldehyde resin based undercoats, one or more epoxy resin based undercoats, and/or one or more polyurethane resin based undercoats. For example, the phenolic-formaldehyde resin, epoxy resin, and/or polyurethane resin based undercoat layer may be a coating that is known in the art, e.g., known in the art for coating proppants. For example, for forming a permeable or semi-permeable layer, flexible epoxy resins (such D.E.R.™ 736, D.E.R.™ 732, D.E.R.™ 750, D.E.R.™ 3913, and any combination of the preceding, available from The Dow Chemical Company) may be used.

Optionally, additional coatings/layers, e.g., a coating/layer derived from one or more preformed isocyanurate tri-isocyanates and one or more curatives, may be formed under the polymer resin matrix. For example, at least one additional coating/layer derived from one or more preformed isocyanurate tri-isocyanates may be formed between a polymer resin based undercoat and the heavy metal recovery coating. In exemplary embodiments, the polymer resin matrix is a polyurethane based matrix, and the optional one or more polymer resin based undercoats (if included) includes at least one polyurethane resin and/or epoxy resin based undercoat. In exemplary embodiments, the polymer resin matrix is an epoxy based matrix, the optional one or more polymer resin based undercoats (if included) includes at least one polyurethane based undercoat and/or epoxy resin based undercoat (which encompasses polyurethane/epoxy hybrid undercoats). For example, the optional polymer resin based undercoat includes at least 75 wt %, at least 85 wt %, at least 95 wt %, and/or at least 99 wt % of polyurethane resins, epoxy resins, and/or polyurethane/epoxy hybrid resins, based on the total weight of the resins in the resultant coating.

For example, the metal-sulfate crystals, such as barium sulfate, may be embedded into a polyurethane based matrix and/or epoxy based matrix, which acts as a permeable or semi-permeable polymer resin, on the solid core proppant particle. In exemplary embodiments, the barium sulfate is embedded within matrix that includes polyurethane polymers, epoxy polymers, or hybrid polyurethane/epoxy polymers. The heavy metals may be rendered immobile on an outer surface of the proppant particle surface by the metal-sulfate crystals and/or the polyurethane based matrix and/or epoxy based matrix; and/or the heavy metals may be rendered immobile embedded within the polyurethane based matrix and/or epoxy based matrix. The polyurethane based matrix may additionally provide benefits associated with proppants having a polyurethane based coating thereon, such as enhanced strength. The epoxy based matrix may additionally provide benefits associated with an epoxy coating.

For example, epoxy based coatings (e.g., based on epoxy and epoxy hardener chemistry) have been proposed for use in forming coatings. As used herein, epoxy based coatings encompass the chemistry of an epoxy resin and an amine based epoxy hardener, with an amino hydrogen/epoxy resin stoichiometric ratio range over all possible stoichiometric ratios (e.g., from 0.60 to 3.00, from 0.60 to 2.00, from 0.80 to 1.20, from 0.85 to 1.05, etc.). Polyurethane based coatings (e.g., based on polyurethane chemistry), have been proposed for use in forming coatings on proppants such as sand and ceramics. As used herein, the term polyurethane encompasses the reaction product of a polyol (e.g., polyether polyol and/or polyester polyol) with an isocyanate index range over all possible isocyanate indices (e.g., from 50 to 1000). Polyurethanes offer various advantages in resin-coated proppant applications, e.g., such as ease of processing, base stability, and/or rapid cure rates that enable short cycle times for forming the coating. Polyurethane/epoxy hybrid coatings incorporate both epoxy based chemistry and polyurethane based chemistry to form hybrid polymers. For example, polyurethane/epoxy hybrid coatings may be formed by mixing and heating an epoxy resin containing hydroxyl groups, an isocyanate component (such as an isocyanate or an isocyanate-terminated prepolymer, and optionally a polyol component (e.g., may be excluded when an isocyanate-terminated prepolymer is used). Thereafter, an epoxy hardener may be added to the resultant polymer. Liquid epoxy resins known in the art may be used to form such a coating.

For example, the epoxy based matrix the liquid epoxy resin may be cured by one or more hardener, which may be any conventional hardener for epoxy resins. Conventional hardeners may include, e.g., any amine or mercaptan with at least two epoxy reactive hydrogen atoms per molecule, anhydrides, phenolics. In exemplary embodiments, the hardener is an amine where the nitrogen atoms are linked by divalent hydrocarbon groups that contain at least 2 carbon atoms per subunit, such as aliphatic, cycloaliphatic, or aromatic groups. For example, the polyamines may contain from 2 to 6 amine nitrogen atoms per molecule, from 2 to 8 amine hydrogen atoms per molecule, and/or 2 to 50 carbon atoms. Exemplary polyamines include ethylene diamine, diethylene triamine, triethylene tetramine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butane diamine, 1,3-butane diamine, 1,4-butane diamine, 1,5-pentane diamine, 1,6-hexane diamine, 2-methyl-1,5-pentanediamine, and 2,5-dimethyl-2,5-hexanediamine; cycloaliphatic polyamines such as, for example, isophoronediamine, 1,3-(bisaminomethyl)cyclohexane, 4,4'-diaminodicyclohexylmethane, 1,2-diaminocyclohexane, 1,4-diamino cyclohexane, isomeric mixtures of bis(4-aminocyclohexyl)methanes, bis(3-methyl-4-aminocyclohexyl)methane (BMACM), 2,2-bis(3-methyl-4-aminocyclohexyl)propane (BMACP), 2,6-bis(aminomethyl)norbornane (BAMN), and mixtures of 1,3-bis(aminomethyl)cyclohexane and 1,4-bis(aminomethyl)cyclohexane (including cis and trans isomers of the 1,3- and 1,4-bis (aminomethyl)cyclohexanes); other aliphatic polyamines, bicyclic amines (e.g., 3-azabicyclo[3.3.1]nonan); bicyclic imines (e.g., 3-azabicyclo[3.3.1]non-2-ene); bicyclic diamines (e.g. 3-azab'i'cyclo[3.3.1]nonan-2-amine); heterocyclic diamines (e.g., 3,4 diaminofuran and piperazine); polyamines containing amide linkages derived from "dimer acids" (dimerized fatty acids), which are produced by condensing the dimer acids with ammonia and then optionally hydrogenating; adducts of the above amines with epoxy resins, epichlorohydrin, acrylonitrile, acrylic monomers, ethylene oxide, and the like, such as, for example, an adduct of isophoronediamine with a diglycidyl ether of a dihydric phenol, or corresponding adducts with ethylenediamine or m-xylylenediamine; araliphatic polyamines such as, for example, 1,3-bis(aminomethyl)benzene, 4,4'diaminodiphenyl methane and polymethylene polyphenylpolyamine; aromatic polyamines (e.g., 4,4'-methylenedianiline, 1,3-phenylenediamine and 3,5-diethyl-2,4-toluenediamine); amidoamines (e.g., condensates of fatty acids with diethylenetriamine, triethylenetetramine, etc.); polyamides (e.g., condensates of dimer acids with diethylenetriamine, triethylenetetramine; oligo(propylene oxide)diamine; and Mannich bases (e.g., the condensation products of a phenol, formaldehyde, and a polyamine or phenalkamines). Mixtures of more than one diamine and/or polyamine can also be used.

For example, polyurethane based matrix may be the reaction product of an isocyanate component and an isocyanate-reactive component. For a polyurethane based matrix, the isocyanate component may include a polyisocyanate and/or an isocyanate-terminated prepolymer and the isocyanate-reactive component may include a polyether polyol. For a polyurethane/epoxy hybrid based matrix, the isocyanate component may include a polyisocyanate and/or an isocyanate-terminated prepolymer and the isocyanate-reactive component may include an epoxy resin containing hydroxyl groups and optionally a polyether polyol. Similarly, the optional one or more polyurethane based undercoats, under the heavy metal recovery coating, may be the reaction product of a same or a different isocyanate component and a same or a different isocyanate-reactive component. In exemplary embodiments, a single isocyanate component may be used to form both a polyurethane based undercoat and a separately formed polyurethane based matrix. For example, a first isocyanate-reactive component may be added to solid core proppant particles to start the formation of the polyurethane based undercoat, then a first isocyanate component may be added to the resultant mixture to form the polyurethane based undercoat, and then a second isocyanate-reactive component (e.g., that includes the heavy metal recovery crystals in the carrier polyol) may be added to the resultant mixture to form the heavy metal recovery coating. In other exemplary embodiments, one isocyanate-reactive component (e.g., that includes the heavy metal recovery crystals in one or more polyols that includes at least a carrier polyol) and one isocyanate component may be used to form the polyurethane based matrix and formation of an additional coating thereunder may be excluded.

The isocyanate-reactive component includes at least a polyol that has a number average molecular weight from 150 g/mol to 6000 g/mol (and optionally additional polyols) and includes a catalyst component having at least a catalyst (and optionally additional catalysts). The mixture for forming the polyurethane based matrix may have an isocyanate index that is at least 60 (e.g., at least 100). The polyurethane based matrix may be highly resistant to the conditions encountered in immersion in fracturing fluids at elevated temperatures. For example, the polyurethane based matrix used may be similar to a polyurethane coating discussed in, e.g., U.S. Patent Publication No. 2013/0065800.

For forming the polyurethane based matrix and/or the optional polyurethane based undercoat, the amount of the isocyanate component used relative to the isocyanate-reactive component in the reaction system expressed as the isocyanate index. For example, the isocyanate index may be from 60 to 2000 (e.g., 100 to 1000, 100 to 300, 100 to 200 and/or 125 to 175 etc.). The isocyanate index is the equivalents of isocyanate groups (i.e., NCO moieties) present, divided by the total equivalents of isocyanate-reactive hydrogen containing groups (i.e., OH moieties) present, multiplied by 100. Considered in another way, the isocyanate index is the ratio of the isocyanate groups over the isocyanate reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

The isocyanate component for forming the polyurethane based matrix (including a polyurethane/epoxy hybrid based matrix) and/or the polyurethane based undercoat may include one or more polyisocyanates, one or more isocyanate-terminated prepolymer derived from the polyisocyanates, and/or one or more quasi-prepolymers derived from the polyisocyanates. Isocyanate-terminated prepolymers and quasi-prepolymers (mixtures of prepolymers with unreacted polyisocyanate compounds), may be prepared by reacting a stoichiometric excess of a polyisocyanate with at least one polyol. Exemplary polyisocyanates include aromatic, aliphatic, and cycloaliphatic polyisocyanates. According to exemplary embodiments, the isocyanate component may only include aromatic polyisocyanates, prepolymers derived therefrom, and/or quasi-prepolymers derived therefrom, and the isocyanate component may exclude any aliphatic isocyanates and any cycloaliphatic polyisocyanates. The polyisocyanates may have an average isocyanate functionality from 1.9 to 4 (e.g., 2.0 to 3.5, 2.8 to 3.2, etc.). The polyisocyanates may have an average isocyanate equivalent weight from 80 to 160 (e.g., 120 to 150, 125 to 145, etc.).

Exemplary isocyanates include toluene diisocyanate (TDI) and variations thereof known to one of ordinary skill in the art, and diphenylmethane diisocyanate (MDI) and variations thereof known to one of ordinary skill in the art. Other isocyanates known in the polyurethane art may be used, e.g., known in the art for polyurethane based coatings. Exemplary commercially available isocyanate products include PAPI™ products, ISONATE™ products and VORANATE™ products, available from The Dow Chemical Company.

The isocyanate-reactive component for forming the polyurethane based matrix (including a polyurethane/epoxy hybrid based matrix) and/or the polyurethane based undercoat includes one or more polyols that are separate from the optional carrier polyol or that include the optional carrier polyol. For example, if the isocyanate-reactive component is added at the same time as the heavy metal recovery crystals, the isocyanate-reactive component may include the optional carrier polyol. If the optional polyurethane undercoat layer is formed before forming the heavy metal recovery coating, the one or more polyols excludes the carrier polyol. The one or more polyols may have a number average molecular weight from 60 g/mol to 6000 g/mol (e.g., 150 g/mol to 3000 g/mol, 150 g/mol to 2000 g/mol, 150 g/mol to 1500 g/mol, 150 g/mol to 1000 g/mol, 150 g/mol to 500 g/mol, 150 g/mol to 400 g/mol, 150 g/mol to 300 g/mol, etc.). The one or more polyols have on average from 1 to 8 hydroxyl groups per molecule, e.g., from 2 to 4 hydroxyl groups per molecule. For example, the one or more polyols may independently be a diol or triol.

When the isocyanate-reactive component is used to form the heavy metal recovery coating, the isocyanate-reactive component may include at least 50 wt %, at least 60 wt %, and/or at least 70 wt % of the one or more polyols (e.g., a low molecular weight polyol having a number average molecular weight of from 150 g/mol to 1000 g/mol), and the amount of the one or more polyols may be less than 90 wt % and/or less than 80 wt %, based on a total weight of the isocyanate-reactive component. When the isocyanate-reactive component is used to form the optional polyurethane based undercoat layer, the isocyanate-reactive component may include at least 80 wt % and/or at least 90 wt % of one or more low molecular weight polyols (e.g., a number average molecular weight of from 150 g/mol to 1000 g/mol), based on a total weight of the isocyanate-reactive component.

The one or more polyols may be alkoxylates derived from the reaction of propylene oxide, ethylene oxide, and/or butylene oxide with an initiator. Initiators known in the art for use in preparing polyols for forming polyurethane polymers may be used. For example, the one or more polyols may be an alkoxylate of any of the following molecules, e.g., ethylene glycol, diethylene glycol, triethylene glycol, 1,2- propanediol, dipropylene glycol, tripropylene glycol, 1,4-butanediol, 1,6-hexanediol, and glycerol. According to exemplary embodiments, the one or more polyols may be derived from propylene oxide and ethylene oxide, of which less than 20 wt % (e.g., and greater than 5 wt %) of polyol is derived from ethylene oxide, based on a total weight of the alkoxylate. According to another exemplary embodiment, the polyol contains terminal ethylene oxide blocks. According to other exemplary embodiments, the polyol may be the initiator themselves as listed above, without any alkylene oxide reacted to it.

In exemplary embodiments, the isocyanate-reactive component may include alkoxylates of ammonia or primary or secondary amine compounds, e.g., as aniline, toluene diamine, ethylene diamine, diethylene triamine, piperazine, and/or aminoethylpiperazine. For example, the isocyanate-reactive component may include polyamines that are known in the art for use in forming polyurethane-polyurea polymers. The isocyanate-reactive component may include one or more polyester polyols having a hydroxyl equivalent weight of at least 500, at least 800, and/or at least 1,000. For example, polyester polyols known in the art for forming polyurethane polymers may be used. The isocyanate-reactive component may include polyols with fillers (filled polyols), e.g., where the hydroxyl equivalent weight is at least 500, at least 800, and/or at least 1,000. The filled polyols may contain one or more copolymer polyols with polymer particles as a filler dispersed within the copolymer polyols. Exemplary filled polyols include styrene/acrylonitrile (SAN) based filled polyols, polyharnstoff dispersion (PHD) filled polyols, and polyisocyanate polyaddition products (PIPA) based filled polyols.

The isocyanate-reactive component for forming the polyurethane based matrix and/or the polyurethane based undercoat may further include a catalyst component. The catalyst component may include one or more catalysts. Catalysts known in the art, such as trimerization catalysts known in art for forming polyisocyanates trimers and/or urethane catalyst known in the art for forming polyurethane polymers and/or coatings may be used. In exemplary embodiments, the catalyst component may be pre-blended with the isocyanate-reactive component, prior to forming the coating (e.g., an undercoat or a heavy metal recovery outer coating).

Exemplary trimerization catalysts include, e.g., amines (such as tertiary amines), alkali metal phenolates, alkali metal alkoxides, alkali metal carboxylates, and quaternary ammonium carboxylate salts. The trimerization catalyst may be present, e.g., in an amount less than 5 wt %, based on the total weight of the isocyanate-reactive component. Exemplary urethane catalyst include various amines, tin containing catalysts (such as tin carboxylates and organotin compounds), tertiary phosphines, various metal chelates, and metal salts of strong acids (such as ferric chloride, stannic chloride, stannous chloride, antimony trichloride, bismuth nitrate, and bismuth chloride). Exemplary tin-containing catalysts include, e.g., stannous octoate, dibutyl tin diacetate, dibutyl tin dilaurate, dibutyl tin dimercaptide, dialkyl tin dialkylmercapto acids, and dibutyl tin oxide. The urethane catalyst, when present, may be present in similar amounts as the trimerization catalyst, e.g., in an amount less than 5 wt %, based on the total weight of the isocyanate-reactive component. The amount of the trimerization catalyst may be greater than the amount of the urethane catalyst. For example, the catalyst component may include an amine based trimerization catalyst and a tin-based urethane catalyst.

Under the heavy metal recovery coating may optionally be formed on at least one additional coating/layer derived from one or more preformed isocyanurate tri-isocyanates. For example, the additional coating/layer may be formed between a polymer resin based undercoat and the heavy metal recovery coating. In embodiments, the additional layer is derived from a mixture that includes one or more preformed isocyanurate tri-isocyanates and one or more curatives. The preformed isocyanurate tri-isocyanate may also be referred to herein as an isocyanate trimer and/or isocyanurate trimer. By preformed it is meant that the isocyanurate tri-isocyanate is prepared prior to making a coating that includes the isocyanurate tri-isocyanate therewithin. Accordingly, the isocyanurate tri-isocyanate is not prepared via in situ trimerization during formation of the coating. In particular, one way of preparing polyisocyanates trimers is by achieving in situ trimerization of isocyanate groups, in the presence of suitable trimerization catalyst, during a process of forming polyurethane polymers. For example, the in situ trimerization may proceed as shown below with respect to Schematic (a), in which a diisocyanate is reacted with a diol (by way of example only) in the presence of both a urethane catalyst and a trimerization (i.e. promotes formation of isocyanurate moieties from isocyanate functional groups) catalyst. The resultant polymer includes both polyurethane polymers and polyisocyanurate polymers, as shown in Schematic (a), below.

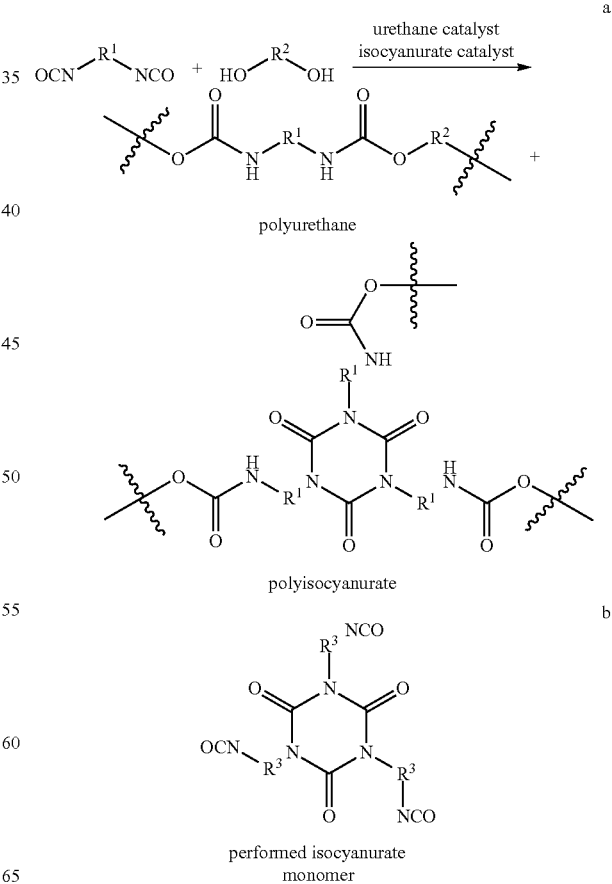

Schematics (a) and (b)

In contrast, referring to Schematic (b) above, in embodiments the preformed isocyanurate tri-isocyanate is provided as a separate preformed isocyanurate-isocyanate component, i.e., is not mainly formed in situ during the process of forming polyurethane polymers. The preformed isocyanurate tri-isocyanate may be provided in a mixture for forming the coating in the form of a monomer, and not in the form of being derivable from a polyisocyanate monomer while forming the coating. For example, the isocyanate trimer may not be formed in the presence of any polyols and/or may be formed in the presence of a sufficiently low amount of polyols such that a polyurethane forming reaction is mainly avoided (as would be understand by a person of ordinary skill in the art). With respect to the preformed isocyanurate tri-isocyanate, it is believed that the existence of isocyanurate rings leads to a higher crosslink density. Further, the higher crosslink density may be coupled with a high decomposition temperature of the isocyanurate rings, which may lead to enhanced temperature resistance. Accordingly, it is proposed to introduce a high level of isocyanurate rings in the coatings for proppants using the preformed isocyanurate tri-isocyanates.

For example, the additional layer may include one or more preformed aliphatic isocyanate based isocyanurate tri-isocyanates, one or more preformed cycloaliphatic isocyanate based isocyanurate tri-isocyanates, or combinations thereof. In exemplary embodiments, the additional layer is derived from at least a preformed cycloaliphatic isocyanate based isocyanurate tri-isocyanate, e.g., the preformed cycloaliphatic isocyanate based isocyanurate tri-isocyanate may be present in an amount from 80 wt % to 100 wt %, based on the total amount of the isocyanurate tri-isocyanates used in forming the additional layer.

Exemplary preformed isocyanurate tri-isocyanates include the isocyanurate tri-isocyanate derivative of 1,6-hexamethylene diisocyanate (HDI) and the isocyanurate tri-isocyanate derivative of isophorone diisocyanate (IPDI). For example, the isocyanurate tri-isocyanates may include an aliphatic isocyanate based isocyanurate tri-isocyanates based on HDI trimer and/or cycloaliphatic isocyanate based isocyanurate tri-isocyanates based on IPDI trimer. Many other aliphatic and cycloaliphatic di-isocyanates that may be used (but not limiting with respect to the scope of the embodiments) are described in, e.g., U.S. Pat. No. 4,937,366. It is understood that in any of these isocyanurate tri-isocyanates, one can also use both aliphatic and cycloaliphatic isocyanates to form an preformed hybrid isocyanurate tri-isocyanate, and that when the term "aliphatic isocyanate based isocyanurate tri-isocyanate" is used, that such a hybrid is also included.

The one or more curatives (i.e., curative agents) may include an amine based curative such as a polyamine and/or an hydroxyl based curative such as a polyol. For example the one or more curatives may include one or more polyols, one or more polyamines, or a combination thereof. Curative known in the art for use in forming coatings may be used. The curative may be added, after first coating the proppant with the preformed aliphatic or cycloaliphatic isocyanurate tri-isocyanate. The curative may act as a curing agent for both the top coat and the undercoat. The curative may also be added, after first coating following the addition of the preformed aliphatic or cycloaliphatic isocyanurate tri-isocyanate in the top coat.

The mixture for forming the additional layer may optionally include one or more catalysts. For example, urethane catalysts known in the art for forming polyurethane coatings may be used. Exemplary urethane catalyst include various amines (especially tertiary amines), tin containing catalysts (such as tin carboxylates and organotin compounds, e.g. stannous octoate and dibutyltin dilaurate), tertiary phosphines, various metal chelates, and metal salts of strong acids (such as ferric chloride, stannic chloride, stannous chloride, antimony trichloride, bismuth nitrate, and bismuth chloride).

The one or more catalysts may optionally be provided in a carrier polyol (e.g., that is the same or different from a carrier polyol used for the heavy metal recovery crystals). For example, the carrier polyol may be a high number average molecular weight polyol. The carrier polyol may be present in an amount of at least 90 wt % (at least 93 wt %, at least 95 wt %, at least 97 wt %, etc.) and less than 99 wt %, based on the total weight of the one or more catalyst and the carrier polyol. The carrier polyol includes at least one polyol that has a number average molecular weight of at least 1000 g/mol (e.g., includes only one or more polyols having the average molecular weight of at least 1000 g/mol). For example, the carrier polyol may have a molecular weight from 3000 g/mol to 6000 g/mol (e.g., 4000 g/mol to 6000 g/mol, 4500 g/mol to 5500 g/mol, etc.). The carrier polyol may have on average from 1 to 8 hydroxyl groups per molecule, e.g., from 2 to 4 hydroxyl groups per molecule. For example, the carrier polyol be a diol or triol.

After forming the additional layer a surfactant may be added, e.g., concurrently with the curative and/or before addition of the curative. For example, the surfactant may be used to improve flow properties with respect to the coating and/or to improve the coating structure. It is believed that the surfactant may assist in enabling the formation of distinct layers on the proppants. Optionally, the isocyanate-to-hydroxyl reaction may be controlled (e.g., end time may be controlled) by adding an acidic compound such as phosphoric acid and/or acid phosphate at a desired conversion ratio.

Various optional ingredients may be included in the reaction mixture for forming the polymer resin matrix, polymer resin based undercoat, and/or the additional coating/layer. For example, reinforcing agents such as fibers and flakes that have an aspect ratio (ratio of largest to smallest orthogonal dimension) of at least 5 may be used. These fibers and flakes may be, e.g., an inorganic material such as glass, mica, other ceramic fibers and flakes, carbon fibers, organic polymer fibers that are non-melting and thermally stable at the temperatures encountered in the end use application. Another optional ingredient is a low aspect ratio particulate filler, that is separate from the proppant. Such a filler may be, e.g., clay, other minerals, or an organic polymer that is non-melting and thermally stable at the temperatures encountered in stages (a) and (b) of the process. Such a particulate filler may have a particle size (as measured by sieving methods) of less than 100 μm. With respect to solvents, the undercoat may be formed using less than 20 wt % of solvents, based on the total weight of the isocyanate-reactive component.

Another optional ingredient includes a liquid epoxy resin. The liquid epoxy resin may be added in amounts up to 20 wt %, based on the total weight of the reaction mixture. Exemplary liquid epoxy resins include the glycidyl polyethers of polyhydric phenols and polyhydric alcohols. Other optional ingredients include colorants, biocides, UV stabilizing agents, preservatives, antioxidants, and surfactants. Although it is possible to include a blowing agent into the reaction mixture to improve permeability, in some embodiments the blowing agent is excluded from the reaction mixture.

Prior to forming any coating of the solid core proppant particular (e.g., under the polymer resin matrix and/or the optional polymer resin based undercoat), a coupling agent may be added, e.g., prior to adding an isocyanate-reactive component. For example, the coupling agent may be a silane based compound such as an aminosilane compound.

Proppants

Exemplary proppants (e.g., solid core proppant particles) include silica sand proppants and ceramic based proppants (for instance, aluminum oxide, silicon dioxide, titanium dioxide, zinc oxide, zirconium dioxide, cerium dioxide, manganese dioxide, iron oxide, calcium oxide, and/or bauxite). Various other exemplary proppant material types are mentioned in literature, such as glass beads, walnut hulls, and metal shot in, e.g., Application Publication No. WO 2013/059793, and polymer based proppants as mentioned by U.S. Patent Publication No. 2011/0118155. The sand and/or ceramic proppants may be coated with a resin to, e.g. to improve the proppant mesh effective strength (e.g., by distributing the pressure load more uniformly), to trap pieces of proppant broken under the high downhole pressure (e.g., to reduce the possibility of the broken proppants compromising well productivity), and/or to bond individual particles together when under the intense pressure and temperature of the fracture to minimize proppant flowback. The proppants to be coated may have an average particle size from 50 μm to 3000 μm (e.g., 100 μm to 2000 μm).

Proppant particle (grain or bead) size may be related to proppant performance. Particle size may be measured in mesh size ranges, e.g., defined as a size range in which 90% of the proppant fall within. In exemplary embodiments, the proppant is sand that has a mesh size of 20/40. Lower mesh size numbers correspond to relatively coarser (larger) particle sizes. Coarser proppants may allow higher flow capacity based on higher mesh permeability. However, coarser particles may break down or crush more readily under stress, e.g., based on fewer particle-to-particle contact points able to distribute the load throughout the mesh. Accordingly, coated proppants are proposed to enhance the properties of the proppant particle.

According to embodiments, the proppants are coated with at least a heavy metal recovery coating that includes heavy metal recovery crystals embedded within a polymer resin matrix. Optional one or more polymer resin undercoat layers and/or additional layers may be formed prior to forming the heavy metal recovery coating. The optional polymer resin undercoat and/or additional layers may be form immediately preceding formation of the heavy metal recovery coating or a previously coated proppant may be coated with the heavy metal recovery coating. The proppants may be coated with other layers, e.g., between an underlying layer and the solid core proppant particle, between an underlying layer and the heavy metal recovery coating, and/or on the heaving metal recover coating opposing the solid core proppant particle. In exemplary embodiments, a polyurethane based undercoat is formed directly on the solid core proppant particle (e.g., which does not have a resin layer previously formed thereon) and the heavy metal recovery layer having a polyurethane based matrix is formed on the polyurethane based undercoat. For example, the heavy metal recovery layer may be directly on the polyurethane based undercoat or a layer derived from one or more preformed isocyanurate tri-isocyanates.

The performance of coatings for proppants, especially in downwell applications at higher temperatures (such as greater than 120° C.) and elevated pressures (such as in excess of 6000 psig), may be further improved by designing coatings that retain a high storage modulus at temperatures of up to at least 175° C., which may be typically encountered during hydraulic fracturing of deep strata. The coating may have a glass transition temperature greater than at least 140° C., e.g., may not realize a glass transition temperature at temperatures below 160° C., below 200° C., below 220° C., below 240° C., and/or below 250° C. The resultant coating may not realize a glass transition temperature within a working temperature range typically encountered during hydraulic fracturing of deep strata. For example, the resultant coating may not realize a glass transition temperature within the upper and lower limits of the range from 25° C. to 250° C. Accordingly, the coating may avoid a soft rubbery phase, even at high temperatures (e.g., near 200° C. and/or near 250° C.). For example, coatings that exhibit a glass transition temperature within the range of temperatures typically encountered during hydraulic fracturing of deep strata, will undergo a transition from a glassy to rubbery state and may separate from the proppant, resulting in failure.

A total amount of all the optional underlying layers may be from 0.5 wt % to 4.0 wt % (e.g., 1.0 wt % to 3.5 wt %, 1.5 wt % to 3.0 wt %, 1.7 wt % to 2.5 wt %, etc.), based on the total weight of the coated proppant. An amount of the heavy metal recovery coating may be from 0.1 wt % to 2.5 wt % (e.g., 0.1 wt % to 2.0 wt %, 0.1 wt % to 1.5 wt %, 0.1 wt % to 1.0 wt %, 0.3 wt % to 0.8 wt %, etc.), based on the total weight of the coated proppant. A total amount of coatings on the proppant may be from 0.1 wt % to 6.0 wt %, based on the total weight of the coated proppant. For example, the ratio a polymer resin based undercoat to the heavy metal recovery coating may be from 1:1 to 3:1, such that the amount of the top coat is equal to or less than the amount of the undercoat. A thickness of all the underlying undercoat layers may be from 1 μm to 50 μm. A thickness of the heavy metal recovery coating may be from 0.1 μm to 30.0 μm (e.g., from 0.1 μm to 20.0 μm, from 0.1 μm to 10.0 μm, from 0.1 μm to 5.0 μm, from 0.1 to 2.5 μm, from 0.1 to 1.5 μm, from 0.1 μm to 1.0 μm, etc.). A thickness of the heavy metal recovery coating may be less than a thickness of all of the optional underlying layers.

Coating Process

To coat the proppant, in exemplary embodiments any optional undercoat layer (e.g., a polyurethane based layer) may be formed first. Thereafter, the heavy metal recovery coating prepared using heavy metal recovery crystals and the polymer resin matrix may be formed on (e.g., directly on) the proppant and/or the optional underlying undercoat. In a first stage of forming coated proppants, solid core proppant particles (e.g., which do not have a previously formed resin layer thereon) may be heated to an elevated temperature. For example, the solid core proppant particles may be heated to a temperature from 50° C. to 180° C., e.g., to accelerate crosslinking reactions in the applied coating. The pre-heat temperature of the solid core proppant particles may be less than the coating temperature for the coatings formed thereafter. For example, the coating temperate may be from 40° C. to 170° C. In exemplary embodiments, the coating temperature is at least 85° C. and up to 170° C.

Next, the heated proppant particles are sequentially blended (e.g., contacted) with the desired components for forming the one or more coatings. For example, the proppant core particles may be blended with a first isocyanate-reactive component in a mixer, and subsequently thereafter other components for forming the desired one or more coatings. For an epoxy based matrix, the proppant core particles may be blended with the a liquid epoxy resin (e.g., that acts as a carrier polymer for the heavy metal recovery crystals) in the mixer. In exemplary embodiments, a process of forming the one or more coatings may take less than 10 minutes, after the stage of pre-heating the proppant particles and up until right after the stage of stopping the mixer.

The mixer used for the coating process is not restricted. For example, as would be understood by a person of ordinary skill in the art, the mixer may be selected from mixers known in the specific field. For example, a pug mill mixer or an agitation mixer can be used. The mixer may be a drum mixer, a plate-type mixer, a tubular mixer, a trough mixer, or a conical mixer. Mixing may be carried out on a continuous or discontinuous basis. It is also possible to arrange several mixers in series or to coat the proppants in several runs in one mixer. In exemplary mixers it is possible to add components continuously to the heated proppants. For example, isocyanate component and the isocyanate-reactive component may be mixed with the proppant particles in a continuous mixer in one or more steps to make one or more layers of curable coatings.

Any coating formed on the proppants may be applied in more than one layer. For example, the coating process may be repeated as necessary (e.g. 1-5 times, 2-4 times, and/or 2-3 times) to obtain the desired coating thickness. The thicknesses of the respective coatings of the proppant may be adjusted. For example, the coated proppants may be used as having a relatively narrow range of proppant sizes or as a blended having proppants of other sizes and/or types. For example, the blend may include a mix of proppants having differing numbers of coating layers, so as to form a proppant blend having more than one range of size and/or type distribution.

The coated proppants may be treated with surface-active agents or auxiliaries, such as talcum powder or steatite (e.g., to enhance pourability). The coated proppants may be exposed to a post-coating cure separate from the addition of the curative. For example, the post-coating cure may include the coated proppants being baked or heated for a period of time sufficient to substantially react at least substantially all of the available reactive components used to form the coatings. Such a post-coating cure may occur even if additional contact time with a catalyst is used after a first coating layer or between layers. The post-coating cure step may be performed as a baking step at a temperature from 100° C. to 250° C. The post-coating cure may occur for a period of time from 10 minutes to 48 hours.

All parts and percentages are by weight unless otherwise indicated. All molecular weight information is based on number average molecular weight, unless indicated otherwise.

EXAMPLES

Approximate properties, characters, parameters, etc., are provided below with respect to various working examples, comparative examples, and the materials used in the working and comparative examples.

For polyurethane based examples, the materials principally used, and the corresponding approximate properties thereof, are as follows:

Sand Northern White Frac Sand, having a 20/40 mesh size.
Coupling Agent A coupling agent based on aminopropyltrimethoxysilane (available as Silquest™ A-1100 from Momentive).
Polyol A A glycerine initiated propylene oxide based polyether triol, having a number average molecular weight of 250 g/mol (available from The Dow Chemical Company).
Polyol B A glycerine initiated propylene oxide based polyether triol with ethylene oxide capping (EO content of less than 20 wt %), having a number average molecular weight of 4900 g/mol (available as VORANOL™ 4701 from The Dow Chemical Company).
Barium Sulfate A mixture that has 98.9% purity of barium sulfate, described as having approximately 1 μm sized average particles) (available as ExBAR W1 from Excalibur Minerals LLC).
Isocyanate Polymeric methylene diphenyl diisocyanate (PMDI), having an NCO content of approximately 30.8 wt % (available from The Dow Chemical Company).
Catalyst 1 A dibutyltin dilaurate based catalyst that promotes the urethane or gelling reaction (available as Dabco® T-12 from Air Products®).
Catalyst 2 A tertiary amine based catalyst that promotes the polyisocyanurate reaction, i.e., trimerization (available as Dabco® TMR from Air Products®).
Pigment A pigment added for enhanced visibility of a layer, which is mainly used for experimental purposes herewithin (available as COLORMATCH® DL-50291 from Chromaflo).
IPDI Trimer A preformed cycloaliphatic isocyanate based trimer (an isocyanurate triisocyanate) derived from isophorone diisocyanate, supplied at 70% solids in butyl acetate, having an isocyanate content of 12.3 wt %, and having an isophorone diisocyanate monomer content of less than 0.5% (available as Tolonate™ IDT 70 B from Vencorex Chemicals).
Surfactant A surfactant based on cocamidopropyl hydroxysultaine (for example, available from Lubrizol).

The approximate conditions (e.g., with respect to time and amounts) and properties for forming Working Examples 1 to 5 and Control Example A are described below.

Coated Working Example 1

Coated sand of Working Example 1 has a multilayer coated structure that includes 2.0 wt % of an undercoat that is a polyurethane based layer and 0.5 wt % of a top coat prepared using a barium sulfate filled polyol, based on the total weight of the coated sand. In particular, the undercoat is prepared using the Polyol A, Isocyanate at an isocyanate index of 190 with respect to the Polyol A, Catalysts 1 and 2, and Pigment. The top coat is prepared using the Polyol B, Barium Sulfate, and Catalyst 1.

In particular, Working Example 1 is prepared using 750 grams of the Sand, which is first heated in an oven to 135° C. to 145° C. Separately, in a beaker a First Pre-mix that includes a stirred mixture of 3.600 grams of the Polyol A, 0.075 grams of Catalyst 1, 0.130 grams of Catalyst 2, and 1.125 grams of Pigment, is formed. In another beaker, a Second Pre-mix that includes a stirred mixture of 3.5 grams of Polyol B, 6.0 grams of Barium Sulfate, and 0.1 grams of Catalyst 1, is formed.

The coating of Working Example 1 is started when the Sand, have a temperature around 125° C., is introduced into a KitchenAid® mixer equipped with a heating jacket, to start a mixing process. During the above process, the heating jacket is maintained at 60% maximum voltage (maximum voltage is 120 volts, where the rated power is 425 W and rated voltage is 115V for the heating jacket) and the mixer is set to medium speed (speed setting of 5 on based on settings from 1 to 10). To start the coating process of the Sand, 0.4 mL of the Coupling Agent is added to the Sand in the mixer, while the medium speed is maintained. Next, 15 seconds from the start of the addition of the Coupling Agent, the First Pre-Mix is added to the mixer over a period of 5 seconds. Then, 60 seconds after finishing the addition the First Pre-Mix, 11 grams of the Isocyanate is added to the mixer over a period of 40 seconds. Next, 25 seconds after the addition of the Isocyanate, the Second Pre-mix is added to the mixer over a period of 10 seconds. Then, 50 seconds later (~3.5 minutes after the start of the addition of the Coupling Agent), the mixer is stopped and the coated Sand is emptied onto a tray and allowed to cool at room temperature (approximately 23° C.).

Coated Working Example 2

Coated sand of Working Example 2 has a multilayer coated structure that includes 2.0 wt % of an undercoat that is a polyurethane based layer, 1.0 wt % of another coat prepared using the IPDI trimer, and 0.5 wt % of a top coat prepared using a barium sulfate filled polyol, based on the total weight of the coated sand. In particular, the undercoat is prepared using the Polyol A, Isocyanate at an isocyanate index of 190 with respect to the Polyol A, Catalysts 1 and 2, and Pigment. The top coat is prepared using the Polyol B, Barium Sulfate, and Catalyst 1.

In particular, Working Example 2 is prepared using 750 grams of the Sand, which is first heated in an oven to 175° C. to 185° C. Separately, in a beaker a First Pre-mix that includes a stirred mixture of 3.600 grams of the Polyol A, 0.05 grams of Catalyst 1, 0.130 grams of Catalyst 2, and 1.125 grams of Pigment, is formed. In another beaker, a Second Pre-mix that includes a stirred mixture of 1.50 grams of Polyol A and 0.05 grams of Catalyst 1, is formed. In another beaker, a Third Pre-mix that includes a stirred mixture of 3.5 grams of Polyol B, 6.0 grams of Barium Sulfate, and 0.1 grams of Catalyst 1, is formed.

The coating of Working Example 2 is started when the Sand, have a temperature around 160° C., is introduced into a KitchenAid® mixer equipped with a heating jacket, to start a mixing process. During the above process, the heating jacket is maintained at 80% maximum voltage (maximum voltage is 120 volts, where the rated power is 425 W and rated voltage is 115V for the heating jacket) and the mixer is set to medium speed (speed setting of 5 on based on settings from 1 to 10). To start the coating process of the Sand, 0.4 mL of the Coupling Agent is added to the Sand in the mixer, while the medium speed is maintained. Next, 15 seconds from the start of the addition of the Coupling Agent, the First Pre-Mix is added to the mixer over a period of 5 seconds. Then, 50 seconds after finishing the addition the First Pre-Mix, 11 grams of the Isocyanate is added to the mixer over a period of 40 seconds. Next, 25 seconds after the addition of the Isocyanate, the Second Pre-mix is added to the mixer over a period of 5 seconds. Subsequently, 60 seconds after the addition of the Second Pre-mix, 6.0 grams of the IPDI Trimer is added to the mixer over a period of 30 seconds. Next, 20 seconds after the addition of the IPDI Trimer, the Third Pre-mix is added to the mixer over a period of 10 seconds. Then, 30 seconds later (~5 minutes after the start of the addition of the Coupling Agent), the mixer is stopped and the coated Sand is emptied onto a tray and allowed to cool at room temperature (approximately 23° C.).

Coated Working Example 3

Coated sand of Working Example 3 has a coated structure that includes 3.2 wt % of a coating that has barium sulfate embedded within a polyurethane matrix.

In particular, Working Example 3 is prepared using 750 grams of the Sand, which is first heated in an oven to 135° C. to 145° C. Separately, in a beaker a First Pre-mix that includes a stirred mixture of 12.5 grams of Polyol A, 4.9 grams of Barium Sulfate, and 0.3 grams of Catalyst 1, is formed.

The coating of Working Example 1 is started when the Sand, have a temperature around 107° C., is introduced into a KitchenAid® mixer equipped with a heating jacket, to start a mixing process. During the above process, the heating jacket is maintained at 60% maximum voltage (maximum voltage is 120 volts, where the rated power is 425 W and rated voltage is 115V for the heating jacket) and the mixer is set to medium speed (speed setting of 5 on based on settings from 1 to 10). To start the coating process of the Sand, 0.4 mL of the Coupling Agent is added to the Sand in the mixer, while the medium speed is maintained. Next, 15 seconds from the start of the addition of the Coupling Agent, the First Pre-Mix is added to the mixer over a period of 120 seconds. Then, 30 seconds after finishing the addition the First Pre-Mix, 12 grams of the Isocyanate is added to the mixer over a period of 40 seconds. Next, 60 seconds after the addition of the Isocyanate, 1.0 mL of the Surfactant is added to the mixer. Then, 35 seconds later (~6 minutes after the start of the addition of the Coupling Agent), the mixer is stopped and the coated Sand is emptied onto a tray and allowed to cool at room temperature (approximately 23° C.).

Evaluation of Properties

The following tests methods are used:

Radium Absorption for Working Examples 1 and 2 is performed using radioactive brine water containing approximately 5000 pCi/L of $^{226}$Ra. The brine water additionally includes a composition of 5.0 wt % of NaCl, 2.6 wt % of $CaCl_2$, and in some experiments 0.07 wt % of $BaCl_2:2H2O$, with the remainder being water. These conditions are considered representative of Marcellus flowback water with respect to radioactivity and salt content, as seen from "Determination of Cations in Hydraulic Fracturing Flowback Water from the Marcellus Shale" by Carl Fisher and Richard Jack in Application Note 1094 published by Thermo Scientific.

Referring to Table 1, below, time dependent radium capture measurements on Working Example 1 relative to the neat barium sulfate in Control Example A at 90° C. is measured using liquid scintillation counting. Before liquid scintillation counting, each aliquot is gently evaporated in order to expel $^{222}$Rn gas, which can interfere with the $^{226}$Ra measurement. Further, two counting windows are used: (i) registers counts due to both $^{226}$Ra and $^{222}$Rn, and (ii) registers counts only due to $^{222}$Rn. A correction factor is established using water from a Radon generator to correct for $^{222}$Rn interference on $^{226}$Ra. The solutions for analysis are prepared as follows:

Working Example 4: 360 grams of the radioactive brine water and 90 grams of Working Example 1 (rinsed three times with deionized water to remove fines before adding to the brine water); and Control Example A: 360 grams of the radioactive brine water and 90 grams of the Barium Sulfate (i.e., neat barium sulfate crystal powder is added).

The mixtures of Working Example 4 and Control Example A are placed in an oven at 90° C. and agitated periodically by swirling. The before mixing samples are removed before the addition of the Barium Sulfate. After reaching 90° C., the mixture is further mixed by swirling for 2-3 minutes, and then the after mixing samples are removed. Thereafter, the mixtures are allowed to sit for three days, in the oven at 90° C. with periodic agitation by swirling, for the collection of the three day samples. Subsequently, the mixtures are allowed to sit for an additional four days, in the oven at 90° C. with periodic agitation by swirling, for the collection of the seven day samples. After final sampling, the brine water was thoroughly drained and packaged for gamma-ray spectrometry, in order to account for radiation balance.

In Table 1, fraction remaining refers to the count rate for the sample divided by the count rate before the start of experimentation. In particular, the fraction of radium remaining in the brine water refers to the amount (as radiation measurement in picoCurie—pCi) of the radium that remains in the water, relative to the sample collected before mixing. Data is the average of two independent measurements.

TABLE 1

| Brine Water | Sample | Working Example 4 (fraction of radium remaining in brine water) | Control Example A (fraction of radium remaining in brine water) |
|---|---|---|---|
| Includes BaCl$_2$ | Before Mixing | 1.00 | 1.00 |
| | After Mixing | 0.93 | 0.96 |
| | After Three Days | 0.77 | 0.71 |
| Excludes BaCl$_2$ | Before Mixing | 1.00 | 1.00 |
| | After Mixing | 0.86 | 0.46 |
| | After Three Days | 0.50 | 0.05 |

As shown in Table 1, it is seen that when the brine water includes BaCl$_2$, for the coated proppant sample of Working Example 4, radium absorption similar to that realized by the neat barium sulfate sample of Control Example A is realized. Accordingly, when the brine water includes BaCl$_2$, radium absorption similar to adding neat barium sulfate may be realized, while minimizing the problems/disadvantages generally associated with having barium sulfate in fracturing water (such as scaling). When the brine water excludes, BaCl$_2$, it is seen that Working Example 4 still provides very good radium absorption, while still minimizing the problems/disadvantages generally associated with having barium sulfate in fracturing water.

Referring to Table 2, below, the radiation balances with respect to radium-226 for Working Example 4 and Control Example A are measured using gamma-ray spectroscopy at the end of experimentation, i.e., after seven days. Standard deviation is computed from counting statistics and reflects measurement error.

TABLE 2

| Brine Water | Working Example 4 (Percent of original activity) | Control Example A (Percent of original activity) |
|---|---|---|
| Includes BaCl$_2$ | 26.1 ± 1.8 | 31.5 ± 1.4 |
| Excludes BaCl$_2$ | 56.6 ± 2.6 | 85.0 ± 4.0 |

As shown in Table 2, it is seen that the coated proppant of Working Example A provides significant amount of radium absorption (as a radiation balance based on percent of activity), comparable to the neat barium sulfate sample of Control Example A, while minimizing the problems/disadvantages generally associated with having barium sulfate in fracturing water.

Scanning Electron Microscopy (SEM) imaging for the coatings on Working Example 1 is obtained using an FEI Nova NanoSEM 600 scanning electron microscope equipped with backscatter electron detector (vCD), and a secondary electron detector (TLD). Resin coated sand specimens were prepared for (1) low magnification top-down imaging using a vCD detector in Field Free lens mode, and (2) high magnification specimens were prepared for top-down imaging using mixed vCD and TLD detectors in Immersion lens mode. For the (1) low magnification imaging, a small amount of the sand is placed into a shallow dish and sputter coated with Au/Pd for 20 seconds. The specimen is removed from the sputter coater, gently shaken to expose the uncoated side of the sand, and sputter coated again. This is performed for a total of three times ensuring that a thin coating of metal is applied to the resin coated sand surface. The Au/Pd coated sand is then mounted to an aluminum stub using carbon tape. The mounted specimens are then sputter coated for 15 seconds with Ir. Low magnification images were obtained at 10 kV accelerating voltage revealing the overall distribution of the BaSO$_4$ on the resin coated sand. For the (2) high magnification imaging, a small amount of resin coated sand was mounted directly onto an aluminum stub using a fast setting, five minute epoxy. The specimen was then sputter coated for 15 seconds with Ir. High magnification images were acquired at 5 kV accelerating voltage using mixed detector signal (both vCD and TLD), showing the BaSO$_4$ particles in greater detail at/near the resin coated sand surface.

Figure 2:
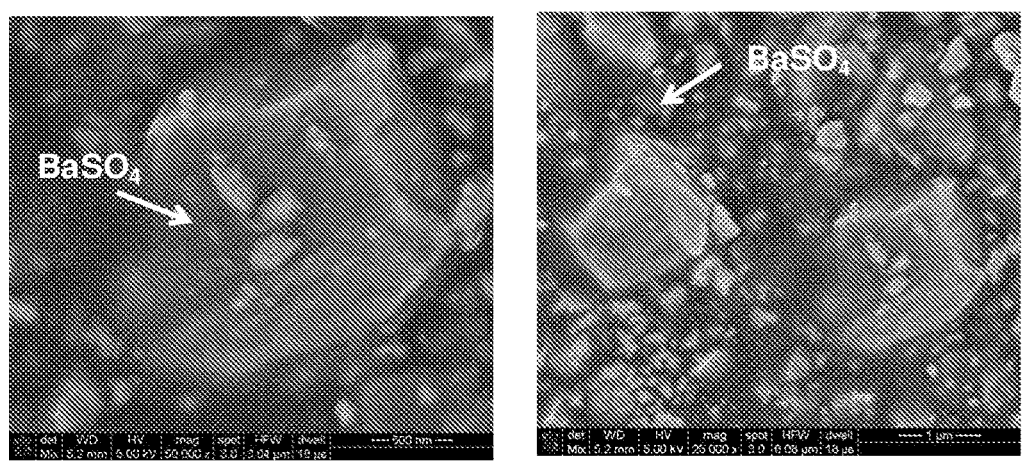
FIG. 2 illustrates SEM analysis at 5.0 kV of two different samples of coated sand at with scale bars, as indicated.

FIGS. 1 and 2 illustrate various images of coated sand samples of Working Example 1. In particular FIG. 1 illustrates eight different samples of coated sand with scale bars at 400 µm (SEM performed at 10.0 kV). FIG. 2 illustrates two different samples of coated sand at with scale bars at 500 nm and 1 µm (SEM performed at 5.0 kV). Referring to FIGS. 1 and 2, it is seen that distinguishable coatings are formed on the Sand, which coatings include the undercoat (with pigment) and the top coat with Barium Sulfate. In particular, the low voltage electron imaging of the surface suggests that barium sulfate particles (BaSO$_4$) are coated with polyol so as to be embedded in a polyurethane based matrix. The bright areas in the figures on the coated sand contain barium sulfate.

Radium Absorption/Retention of Working Example 3 (coated sand) is evaluated using the following procedures.

Working Example 3: 2.2 grams of Working Example 3 is added to a 20 mL glass scintillation vial. Then, 4.0 mL of a 1 wt % Ca$^{2+}$ solution (prepared using CaCl$_2$) is added to the vial. Next, 0.5 mL of a radium stock solution, which was prepared to have 1 wt % Ca$^{2+}$ and 0.62 µCi/mL of radium-223 (which has a half-life of 11.43 days) as extracted from Xofigo (from Bayer, a solution of radium-223 dichloride), is added to the vial. The mixture then has 0.068 µCi/mL of radium-223, which is equivalent on an equimolar basis to about 1300 pCi/L of radium-226. The resultant mixture is kept agitated in a VWR Signature™ Incubating Rocker, with chamber heating set to 65° C., for a period of 16.0 hours. Then, the mixture is removed from the VWR Incubating Rocker. Next, all the supernatant liquid is extracted into a separate container and measured, and here the liquid registers 39847 counts over 60 seconds. The solids are measured, and here the solids register 16253 counts. Accordingly, it is found that 29 wt % of the $^{223}$Ra originally provided in the radium stock solution is removed from the solution by use of the coated sand of Working Example 3, and 71 wt % of the $^{223}$Ra remains in the supernatant liquid. These measurements were done as follows: Gamma photon (X-ray) analysis for quantifying radioactivity (and thus quantity) of $^{223}$Ra in a specimen was done using a germanium (Ge) cylindrical (about 5 cm in diameter) detector. Photon counts were integrated from energy of 86.79 keV to 78.66 keV, and baseline corrected. Standard deviation of the measurement was square root of the total count (including the baseline count).

For liquid epoxy resin based examples, the materials principally used, and the corresponding approximate properties thereof, are as follows:

Epoxy Resin 1 A liquid epoxy resin that is a reaction product of epichlorohydrin and bisphenol A (available from The Dow Chemical Company as D.E.R.™ 331).

Epoxy Toughener A toughened epoxy binder (available as VORASPEC™ 58 from The Dow Chemical Company).

Prepolymer A methylene diphenyl diisocyanate (MDI) based prepolymer (available from The Dow Chemical Company under the tradename HYPOL™)

Polyol An ethoxylated polyhydric polyol (available as IP 625 from The Dow Chemical Company).

Isocyanate Polymeric methylene diphenyl diisocyanate (PMDI) (available as PAPI™ 580N from The Dow Chemical Company).

Epoxy Hardener An aliphatic polyamine curing agent (available as D.E.H™ 26 from The Dow Chemical Company).

Catalyst 1 A dibutyltin dilaurate based catalyst that promotes the urethane or gelling reaction (available as Dabco® T-12 from Air Products®).

Working Examples 5 to 11 related to liquid epoxy resin based coatings for solid core proppant particles, which liquid epoxy resin based coatings may be used as a polymer matrix for the Barium Sulfate, are prepared according to the formulations in Table 3, below.

5 to 11, once the corresponding blends have reached ambient temperature (~25° C.) the Epoxy Hardener is added. In exemplary embodiments, the polyurethane polymers of Working Examples 8 to 11 are prepared first, to minimize the reaction between an isocyanate moiety (NCO) and amino groups in the Epoxy Hardener, which may result in polyurea polymers.

A stoichiometric ratio of the Amino Hydrogen groups in the formulations to the Liquid Epoxy Resin is calculated as the Amino Hydrogen/LER stoichiometric ratio. Water content is measured according to CSA Z245.20 Section 12.3. Film dry glass transition temperature (Tg) and film wet glass transition temperature are measured according to CSA Z245.20 Section 12.7. Coating cross-section porosity is measured according to CSA Z245.20 Section 12.10.

Referring to Table 3, with particular attention to the Film Dry Tg and the Film Wet Tg, it is seen that the liquid epoxy resin samples have desirable characteristics to use as coatings for solid core proppant particles and to use as a polymer matrix for barium sulfate. Accordingly, in exemplary embodiments the Barium Sulfate may be added to the above, e.g., at a filler content by volume percent from 15 vol % to 50 vol % (e.g., 20 vol % to 25 vol %). With the Barium Sulfate, the resultant formulation may be used to form a heavy metal recovery coating with an epoxy based matrix and/or polyurethane based matrix (for Working Examples 5 to 7 an epoxy based matrix having epoxy polymers; and for Working Examples 8 to 11 an epoxy based matrix and polyurethane based matrix having polyurethane/epoxy hybrid polymers) on the Sand or other solid core proppant particle. For example, the Epoxy Resin 1 and/or Polyether Polyol may act as a carrier polymer for the Barium Sulfate. When the Barium Sulfate is included in the formulations, radionuclide removal testing may be performed. For example, Ra-226 may be determined in brine samples by Liquid Scintillation Counting (LSC) and, after exposure is completed, in the materials by Gamma-ray Spectrometry, as discussed above.

TABLE 3

| | Ex. 5 | Ex. 6 | Ex. 7 | Ex. 8 | Ex. 9 | Ex. 10 | Ex. 11 |
|---|---|---|---|---|---|---|---|
| Formulation (wt %) | | | | | | | |
| Epoxy Resin 1 | 89.5 | 71.8 | 54.4 | 75.2 | 69.9 | 84.6 | 78.5 |
| Epoxy Toughener | — | 17.9 | 36.4 | — | — | — | — |
| Prepolymer | — | — | — | 15.0 | 21.0 | — | — |
| Polyether Polyol | — | — | — | — | — | — | 4.3 |
| Isocyanate | — | — | — | — | — | 3.2 | 5.8 |
| Epoxy Hardener | 10.5 | 10.3 | 9.2 | 9.8 | 9.1 | 12.2 | 11.4 |
| Catalyst 1 | — | — | — | <0.01 | <0.01 | — | — |
| Measured Properties of | | | | | | | |
| Amino Hydrogen/LER stoichiometric ratio | 0.90 | 0.90 | 0.90 | 0.90 | 0.90 | 0.90 | 0.90 |
| Water Content (ppm) | 500 | 500 | 500 | 500 | 2000 | 500 | 500 |
| Film Dry Tg (° C.) | 131.0 | 117.0 | 114.0 | 117.5 | 111.7 | 129 | 121.0 |
| Film Wet Tg (° C.) | 116.0 | 98.7 | 97.0 | 92.4 | 82.4 | 112.0 | 98.0 |
| Coating Cross-section porosity | 2-3 | 2-3 | 2-3 | 3-4 | 4-5 | 1-2 | 3-4 |

Referring to Table 3, the corresponding formulates are prepared by blending the components (except the Epoxy Hardener for all the Working Examples and the Polyether Polyol in Working Example 11) at 3500 rpm for 45 seconds in a FlackTek SpeedMixer™. Then, the blend is placed in an oven for one hour at 60° C. Next, for Working Example 11, the Polyether Polyol is added. Then, for Working Examples

The invention claimed is:

1. A coated proppant, comprising:
   a solid core proppant particle; and
   a heavy metal recovery coating on the solid core proppant particle, the heavy metal recovery coating including heavy metal recovery crystals embedded within a polymer resin matrix that is a permeable or semi-permeable polymer resin with respect to heavy metals; wherein:

the heavy metal recovery crystals are metal sulfates, metal oxides, or any combination thereof, and the heavy metal recovery crystals include at least 20 wt % of barium sulfate, based on the total weight of the heavy metal recovery crystals in the heavy metal recovery coating, and the heavy metal recovery crystals are provided in a carrier polymer when forming the heavy metal recovery coating, the carrier polymer being a crosslinkable resin so as to provide the permeable or semi-permeable polymer resin of the polymer resin matrix and including a polyether polyol or a liquid epoxy resin, and the polymer resin matrix includes one or more polyurethane resins, one or more epoxy resins, and/or one or more polyurethane/epoxy hybrid resins.

2. The coated proppant as claimed in claim 1, wherein the heavy metal recovery crystals include at least 50 wt % of barium sulfate, based on the total weight of the heavy metal recovery crystals in the heavy metal recovery coating.

3. The coated proppant as claimed in claim 1, wherein the polymer resin matrix is at least one selected from the group of a polyurethane based matrix and an epoxy based matrix.

4. The coated proppant as claimed in claim 1, wherein the polymer resin matrix is a polyurethane/epoxy hybrid matrix.

5. The coated proppant as claimed in claim 1, wherein the heavy metal recovery crystals pull radium out of a fracturing fluid surrounding the coated proppant and hold ions of the heavy metals on or within the heavy metal recovery coating.

6. A process for the manufacture of the coated proppant according to claim 1, the process comprising:
providing the solid core proppant particle; and
forming on the solid core proppant particle, the heavy metal recovery coating including the heavy metal recovery crystals embedded within the polymer resin matrix, the heavy metal recovery crystals are added to the carrier polymer before forming the heavy metal recovery coating.

7. The coated proppant as claimed in claim 6, wherein the carrier polymer is present in an amount from 15 wt % to 85 wt %, based on the total weight of the heavy metal recovery crystals and the carrier polymer.

* * * * *